United States Patent [19]

Jacob

[11] 3,718,561
[45] Feb. 27, 1973

[54] POROMERIC POLYMERIC PRODUCTS AND PROCESS THEREFOR

[76] Inventor: Ezekiel J. Jacob, 25 Monroe Place, Brooklyn, N.Y. 11201

[22] Filed: July 7, 1970

[21] Appl. No.: 56,150

Related U.S. Application Data

[63] Continuation of Ser. No. 691,121, Dec. 14, 1967, abandoned.

[52] U.S. Cl. .............................. 204/180 R, 204/130
[51] Int. Cl. ............................ B01d 13/02, B01k 5/00
[58] Field of Search .................... 204/1 R, 180 R, 130

[56] References Cited

UNITED STATES PATENTS

| | | | |
|---|---|---|---|
| 1,174,903 | 3/1916 | Schwerin | 204/180 R X |
| 1,229,150 | 6/1917 | Schwerin | 204/180 R X |
| 1,235,064 | 7/1917 | Schwerin | 204/180 R |
| 1,878,235 | 9/1932 | Gortner et al | 204/180 R X |
| 2,017,049 | 10/1935 | Jones | 204/180 R X |
| 2,092,489 | 9/1937 | Williams | 204/1 R |
| 2,814,592 | 11/1957 | Morrison et al | 204/180 R X |
| 3,352,769 | 11/1967 | Ruben | 204/1 R X |
| 3,375,208 | 3/1968 | Duddy | 204/180 R X |
| 3,523,879 | 8/1970 | Cortes | 204/180 P |
| 3,446,674 | 5/1969 | Giner | 136/86 |
| 1,739,766 | 12/1929 | Morris | 204/180 X |

FOREIGN PATENTS OR APPLICATIONS

| | | | |
|---|---|---|---|
| 145,045 | 3/1921 | Great Britain | 204/180 R |

*Primary Examiner*—John H. Mack
*Assistant Examiner*—A. C. Prescott
*Attorney*—Brumbaugh, Graves, Donohue & Raymond

[57] ABSTRACT

The present invention shows how to make poromeric polymeric products by leaching out water-soluble electrolytes from a polymeric material with the help of galvanic or electrolytic current.

3 Claims, No Drawings

POROMERIC POLYMERIC PRODUCTS AND PROCESS THEREFOR

This application is a continuation of my U.S. application Ser. No. 691,121, filed Dec. 14, 1967 now abandoned.

BRIEF DESCRIPTION OF THE INVENTION

Polymeric films and sheets either self sustaining or affixed to fibrous substrates are used as raincoats, upholstery, shoes. Rubber, nitrocellulose, polyvinyl chloride, polyurethane are commonly known and used materials for this purpose. All these materials prevent the passage of moisture-vapor with the exception of two materials known today, namely "Corfam" manufactured by E.I. Dupont Co Wilmington Delaware, and "Aztran" manufactured by the B.F. Goodrich Co. Akron, Ohio. The trade-marked materials have a great deal of micro-porous interconnecting vesicles or pores disturbing the homogeniety of the 10 mil plastic film, thus providing a high degree of moisture-vapor transmission, without air-permeability. In this invention I calender or cast a 10 mil film of plastic material in which I have incorporated water-soluble electrolyte in dry powdered form. The plastic used was a polyurethane resin named "ESTANE" by the B.F. Goodrich Company and the electrolyte used was micro-pulverized salt non-food grade having sodium ferrocyanide as the free-flowing assistant made by the Diamond Crystal Salt Co. The plastic film was adhered by heat and pressure to a plate of stainless steel. An aluminum plate was placed over the plastic surface which was exposed. The two plates with the salt-containing plastic between were placed in a bath of 5% NaOH. The ensuing galvanic or electrolytic action created a poromeric film of high moisture vapor transmission after all the salt had been leached out. The simple leaching out of the salt did not produce a film of high moisture vapor transmission, without the concurrent electrolytic action. Furthermore simple leaching out of the salt is a protracted and at best an incomplete removal without the concurrent electrolytic action, as invented.

EXAMPLES

The standards of measurement used in this invention for the statement of moisture-Vapor transmission are grams of water lost in 24 hours in a Thwing-Albert Vapometer, made by the Thwing-Albert Instrument Co, Philadelphia, Pa. U.S.A. A disc of the sample to be tested is clamped as a diaphragm to cover the Vapometer. The area of the sample is 31.454 square centimeters. Inside the Vapometer is placed 25cc. of distilled water. The Vapometer is then placed in a dessicator in which is a dessicant such as "Drierite" 20 mesh, indicator grade. The dessicator is maintained at 75° F plus or minus 2° F. The water in the Vapometer will be picked up by the dessicant outside the vapometer through the opening which is covered by the sample under test, the more permeable the sample, the more weight will be lost. This loss in weight of the water in the Vapometer in 24 hours is reported as GRAMS and is the M.V.T. of the sample according to the frame of reference of the present invention. The M.V.T. for Corfam is 0.8; The M.V.T. for Aztran is 0.7; The M.V.T. of samples made according to the present invention ranges from 0.7 to 2.2. All films are of the same thickness, 0.010 inch.

EXAMPLE 1

Estane 5702 (Made by the B.F. Goodrich Co Cleveland Ohio) was used. This was calendered into a ten mil film. The M.V.T. was Zero or too small to measure. 250 grams of salt as described was milled into the Estane, using 100 grams of Estane. This material was calendered into a 10 mil film and leached in repeated (10) changes of water with constant agitation for 48 hours. The M.V.T. was 0.4. The same material was adhered to a stainless steel plate by heat and pressure. An aluminum plate was placed over the unlaminated surface of the plastic, and the three were placed in a tray in a bath of 5% NaOH. After 12 hours the salt had been leached out. The plastic was peeled away from the stainless steel plate, rinsed, dried and checked for M.V.T. The M.V.T. was 2.2.

EXAMPLE 2

| | |
|---|---|
| Estane 5701 | 100 grams |
| Diamond crystal salt tn | 200 grams. |

Mixed on rubber mill, sheeted out to 0.010 inch, assembled into galvanic cell as in example 1, immersed in water alone. M.V.T. of control without galvanic leaching, (leaching being simply carried out in water.) was 0.2 grams. M.V.T. of electrolytically leached sample was 1.3

EXAMPLE 3

| | |
|---|---|
| Estane 5702 | 100 grams |
| Diamond Crystal Salt | 200 grams. |

Mixed on a mill, sheeted out to 0.010, laminated to fabric 80×80 cotton, assembled into a galvanic cell. Electrolytically leached as in example 1. M.V.T. of the laminate was 1.4. Same laminate leached by immersion in water without galvanic action had an M.V.T. of .5. Laminate can be stitched into shoes.

EXAMPLE 4

| | |
|---|---|
| Estane 5702 | 100 grams |
| Diamond Crystal Salt | 250 grams. |

Mixed on mill, sheeted out to 10 mils, stretched and tacked on to a wooden frame. A sheet of copper was placed on one side of the plastic and a sheet of aluminum on the other. The three were then placed on a tray of water without NaOH. M.V.T. came out eventually at 1.8. Thus it is necessary to keep the plastic taut during galvanic-leaching and the result is almost as good as the results of the previous examples where the plastic was laminated to the stainless steel plate, finally to be stripped away. The lamination and stripping away after galvanic leaching would be a difficult process for continuous rolls of plastic whereas the teaching of this example shows that stretching during galvanic leaching, as in a tenter-frame, would achieve satisfactory results.

EXAMPLE 5

The composition used in Example 1, while being galvanically leached, was connected to a D.C. potential of 2 volts, the aluminum plate being the cathode. The leaching was complete in 20 minutes. The M.V.T. was 2.0

EXAMPLE 6

The composition used in Example 1, while being galvanically leached, was connected to an A.C. potential of 2 volts. The leaching was complete in 30 minutes. The M.V.T. was 1.9.

EXAMPLE 7

The composition used in Example 1 was dissolved in Tetrahydrofuran to a 20 percent solids solution. This solution was knife-coated on to 80×80 cotton fabric, until a dry coating of 0.010 inch was accumulated over the fabric. This took ten separate coating and drying steps. The coated fabric was leached galvanically according to the method of Example 4. The M.V.T. was 1.5.

EXAMPLE 8

| | |
|---|---|
| Geon "POLYBLEND" (B. F. Goodrich Co) | 100 grams |
| Dibutyl Tine Dilaurate | 1 gram |
| Diamond Crystal Salt | 250 grams |

"polyblend" is a mechanical mixture of about 45 parts polyvinyl chloride resin and 55 parts acrylonitrile rubber which acts as a plasticizer for the polyvinyl chloride resin. The composition was mixed on a rubber mill, sheeted out to .010" and galvanically leached according to the teaching of Example #1. The M.V.T. was 1.8 Simple leaching in water without electrolytic action gave an M.V.T. of .3.

Any organic film forming resin, rubber, plastic or polymer can be used as the binder, and any dry fine-mesh soluble electrolyte can be used instead of the salt of the examples. The leaching bath also can use any soluble electrolyte instead of the NaOH. Instead of the Aluminum and Stainless steel plates mentioned, any two metals sufficiently separate in the electromotive series of elements can be used. Where an external potential is applied, the metal plates on either side of the plastic can be made of the same metal. Similar substitutions and modifications can be made by any one skilled in the art without departing from the spirit and scope of my invention as described and as claimed, in the appended claims.

What is claimed is:

1. In the process for producing a poromeric sheet material by leaching out with an aqueous bath a powdered water-soluble electrolyte contained in a polymeric matrix sheet, the improvement which comprises conducting the leaching while concurrently passing a galvanic or electrolytic current through the aqueous leach bath and through the polymeric matrix sheet.

2. The process of producing a poromeric sheet material by milling and otherwise incorporating 100 to 500 parts of a dry electrolyte in powdered form into a polymeric matrix, attaching said matrix to a metal plate, passing a current from this plate to a plate of dissimilar metal on the opposite side of said matrix while held submerged in a water bath to which 5 percent of a dissimilar electrolyte has been added, removing the now poromeric matrix from the plate to which it had been attached.

3. The process of producing a poromeric sheet material by incorporating 100 to 500 parts of sodium chloride into a plastic matrix, forming a sheet from this mixture, leaching out the sodium chloride from said sheet while said sheet is held in stretched condition in a water bath, with the concurrent application of electrical currents through the sheet from one surface to the opposite surface.

* * * * *